(12) United States Patent
Guo

(10) Patent No.: US 8,132,581 B2
(45) Date of Patent: Mar. 13, 2012

(54) METHOD AND SYSTEM FOR WASHING A SEDIMENTATION DEVICE IN A WATER TREATMENT SYSTEM USING ULTRASONIC

(76) Inventor: Shun Guo, Beijing (CN)

( * ) Notice: Subject to any disclaimer, the term of this patent is extended or adjusted under 35 U.S.C. 154(b) by 886 days.

(21) Appl. No.: 12/132,547

(22) Filed: Jun. 3, 2008

(65) Prior Publication Data

US 2008/0230088 A1  Sep. 25, 2008

(51) Int. Cl.
 B08B 3/12 (2006.01)
 B01D 21/28 (2006.01)
(52) U.S. Cl. ............. 134/104.1; 134/174; 134/184; 210/396; 210/408; 210/525; 210/527; 210/531
(58) Field of Classification Search .......... 134/1, 6, 134/57 R, 104.1, 174, 184; 15/93.1; 210/143, 210/396, 408, 525, 527, 528, 531, 803
See application file for complete search history.

(56) References Cited

U.S. PATENT DOCUMENTS

| | | | | |
|---|---|---|---|---|
| 2,845,077 A | * | 7/1958 | Branson | 134/111 |
| 3,033,710 A | * | 5/1962 | Hightower et al. | 134/1 |
| 4,120,699 A | * | 10/1978 | Kennedy et al. | 134/1 |
| 4,358,204 A | * | 11/1982 | Ellner | 366/118 |
| 5,205,174 A | * | 4/1993 | Silverman et al. | 73/623 |

FOREIGN PATENT DOCUMENTS

JP  2001179013 A  *  7/2001

OTHER PUBLICATIONS

Machine Translation of JP 2001179013 to Tanaka et al., Jul. 2001.*

* cited by examiner

*Primary Examiner* — Michael Barr
*Assistant Examiner* — Benjamin Osterhout
(74) *Attorney, Agent, or Firm* — David R. Stevens; Stevens Law Group

(57) ABSTRACT

This invention discloses a method and system for washing a sedimentation device in a water treatment system using ultrasonic waves. The system includes an ultrasonic transmitting device for transmitting the ultrasonic of a predetermined power and transmitting frequency to the sedimentation device, a carrying device positioned inside or outside of the water treatment system for moving the ultrasonic transmitting device over the sedimentation device. The carrying device may include an operation track, a moving car body erected over the operation track, a driving device, and a car body position detection and control device. The effects of the invention are greatly better than that of manual washing with high pressure water. The consumption of water, treatment reagents and manpower can be decreased, thereby decreasing effectively the cost of water production.

10 Claims, 4 Drawing Sheets

METHOD AND SYSTEM FOR WASHING A SEDIMENTATION DEVICE IN A WATER TREATMENT SYSTEM USING ULTRASONIC

TECHNICAL FIELD OF THE INVENTION

The present invention relates to water treatment technology and devices, and especially to a treatment process on a sedimentation device and a method and system for washing the sludge settled in a water treatment system.

BACKGROUND OF THE INVENTION

In a water treatment process, an inclined tube in a mechanical accelerated clarification basin and a corrugated plate in a horizontal flow sedimentation tank have hydrodynamic characteristics, which are used to raise slowly sewage containing active sludge along the inclined tube or the corrugated plate through the specially designed gap space. While raising and translating, the sludge absorbs gradually impurities in water treated by adding a treatment reagent. When the density of the sludge is greater than that of water and sufficient to overcome the lift effect of the rising water, the sludge will settle slowly along the surface or gap of the inclined tubes or the corrugated tubes and slide down into a sludge collecting pond at the bottom. The clarified water rises slowly along the inclined tubes or the corrugated plates through the specially designed gap space to a catchment trough to flow away, thereby the purpose for separating clean water from turbid precipitates is achieved. It can be seen in FIG. 1 the clarification principle of the inclined tubes in the mechanical accelerated clarification basin and the corrugated plates in the horizontal flow sedimentation tank.

Whatever material an inclined tube or corrugated plate is made from, its friction coefficient can not be zero. Therefore when the inclined tube or corrugated plate is used, gradually clogging will occur and become a problem, which causes unsatisfied effect on sludge sliding. For example, after the inclined tube in the mechanical accelerated clarification basin is used for a period of time, the sludge settles on the surface of each inclined tube unevenly. Especially in spring and summer, algae in water propagate prolifically with abundant sunshine. The algae propagated attach to the surface of the inclined tube, which increases the friction coefficient of the inclined tube and decreases the flowability of the sludge settled on the surface of the inclined tube, thereby destroying the hydrodynamic characteristics of the inclined tube. The sludge settled on the surface of the inclined tube is then over-accumulated gradually and cannot slide down, and thus in the inclined tube the space through which cleaned water slowly raises will be gradually clogged by the sludge and algae.

The clogging phenomenon is a progressively developing process. While the total amount of water treated is constant, clogging on a portion of the inclined tube(s) will definitely increase the flow rate of the slowly rising water per unit area above the other portions of the inclined tube(s), thereby changing the hydrodynamic characteristics of the inclined tube(s). When the flow rate of the water increases up to a certain limit (for example, generally 2 mm/sec to 3.0 mm/sec), the requirements for separating clean water from turbid precipitates can not be met. The water with the flow rate increased per unit area will finally flush back up the floccules with the density slightly greater than that of water and the sludge settled on the inclined tube(s) or the corrugated plate(s) from the gap or the inside of the inclined tube, leading to the sediment upturning phenomenon in which the floccules float up to mix with clean water. The mixture flows into a catchment trough that collects clean water, and reaches the next filter tank, so that the clarification basin completely loses its function of separating water from sludge to clarify water. It can be seen in FIG. 2 for the clogging process of the inclined tube(s) in the mechanical accelerated clarification basin or the corrugated plate(s) in the horizontal flow sedimentation tank.

Taking the mechanical accelerated clarification basin as an example, after many years of observation and research, we found the following conclusions. It can be seen in FIG. 3 the relationship between the water treatment capacity of the mechanical accelerated clarification basin and the degree of clogging in the inclined tube(s) (or the corrugated plate(s)). As shown in the figure, the water treatment capacity of the mechanical accelerated clarification basin is inversely proportional to the degree of clogging in the inclined tube (or the corrugated plate), that is, the higher the clogging rate of the inclined tube (or the corrugated plate), the lower its water treatment capacity. As the operation time of the mechanical accelerated clarification basin goes, the clogging rate of the inclined tube (or the corrugated plate) increases continuously, while its water treatment capacity decreases continuously. Therefore, in order to ensure the quality of effluent water from the mechanical accelerated clarification basin, the amount of water treated has to be decreased continuously. Thus, the mechanical accelerated clarification basin generally operates within its design capacity, and its actual treatment capacity decreases gradually. Many mechanical accelerated clarification basins practically operate at levels substantively lower than their design capacities, which is the result of their continuously decreasing thresholds (its actual treatment capacities). The threshold described herein represents the line between two areas shown in FIG. 3, a working area with unsatisfied clarification effect and a working area with satisfied clarification effect. In order to ensure the quality of the effluent water, it is generally to control the treatment amount of water lower than the threshold.

If the treatment amount of water is higher than the threshold, that is, the flow rate of the rising water in the inclined tube (or the corrugated plate) exceeds the design flow rate (for example, exceeds 2.0 mm/sec to 3.0 mm/sec), then a great deal of floccules in the inclined tube will overflow the surface of the inclined tube, the mechanical accelerated clarification basin will lose clarification effect, and the water containing a great deal of floccules will flow to the subsequent filter tank through the catchment trough, thereby causing a great pressure for the filter tank. The pores between filter materials used for filtering will be clogged. Now this problem described above can be solved only by timely backwashing the filter tank and decreasing the amount of water in the mechanical accelerated clarification basin, which, however, will further consume a great amount of water. After a long-term observation, we found that the threshold of the water treatment capacity in the mechanical accelerated clarification basin is a variable which is affected by many factors, such as temperature, water quality, the treatment amount of water, etc. The most important issue is the clogging rate of the inclined tube (or the corrugated plate).

In actual operation, for the sake of furthest ensuring the water treatment capacity in the mechanical accelerated clarification basin, its working point (i.e. the treatment amount of water) is generally adjusted to a level slightly lower than the threshold so that the floccules will not overflow the surface of the inclined tube. However, here the actual treatment capacity of the mechanical accelerated clarification basin is lower than the designed treatment capacity. As the operation time elapses, its actual treatment capacity will further decrease.

Therefore a good deal of floccules will overflow from the inclined tube due to the continuous decreasing of the threshold, even if the treatment amount of water is not changed in the process of operation. This is the basic reason why the mechanical accelerated clarification basin cannot operate steadily over a long period of time. In a word, the inherent defect in the design structure of the mechanical accelerated clarification basin brings great difficulty for managing the water treatment process. This problem has not been solved since the first mechanical accelerated clarification basin in the world began to operate.

The clogging rate is generally measured and adjusted manually in the country, which brings great work stress for operators on duty. Especially in the night when the illumination is not good at the location, it is not easy to find the treatment amount of water exceeding the threshold in time, which causes great wastes of water and a treatment reagent. While the monitoring and controlling levels in the developed countries are much higher than ours, there is no good method for solving this problem radically until now.

When the above phenomenon occurs, that is, the water treatment capacity decreases to a certain degree, in order to ensure the water treatment capacity, the normal way is to stop the operation to drain water entirely, wash the inclined tubes one by one with the high pressure water gun and clean down the clogged sludge and algae completely, and then resume operation. The washing period may be more than ten days or as less as six or seven days. While each washing, a great amount of water with a treatment reagent is drained in vain, and a certain amount of the treated water has to be used in washing process, which causes enormous wastes. According to statistics, typically a water treatment plant will self-consume water about 15% in the production process, among which the self-consumed water resulting from the problem described above will be conservatively estimated to be about 3~5% or even more. Because the mechanical accelerated clarification basin is in the first step of water treatment process, if the quality of its effluent water cannot be guaranteed, it certainly will bring about tremendous pressure for the next treatment process. This is a bottleneck for the water treatment plant in water production process.

Other than the large consumption on manpower and material resources, the method of manual washing can not guarantee a thorough washing and cleaning too. Some dead comers may be always left unwashed, which reduces the effective area of passage of the inclined tube or the corrugated plate. Furthermore, if the process of stopping and washing is not performed frequently, the overweight of the settled sludge will inevitably speeded up the aging and damage of the inclined tube or the corrugated plate, and may cause the supporter supporting the inclined tube and the corrugated plate to be collapsed due to the settled sludge. Additionally, workers' walking ceaselessly on the inclined tube when doing the washing may also causes certain extent of deformation on the surface of the inclined tube, thereby shortening the service life of the inclined tube and aggravating the clogging of the inclined tube.

In conclusion, the gradual clogging caused by the settled sludge in the sedimentation device in these water treatment systems, such as a mechanical accelerated clarification basin or horizontal flow sedimentation tank, has become a difficult problem which perplexes water supply enterprises for a long time, and it is a bottleneck in the water treatment process for each water treatment plant. In order to solve the problem of the settled sludge clogging gradually in the inclined tube (or on the corrugated plate), many methods have been thought of, such as replacing the glass reinforced plastic material of the inclined tube with copolymer material so as to accelerate the sliding of the settled sludge by reducing the friction force, etc. However, the effects are not satisfied. Some researches on this problem were in some articles in water supply journals, but a technical scheme which can thoroughly solve this worldwide problem has not yet been seen so far.

SUMMARY OF THE INVENTION

The object of the present invention is to provide a method and system for washing a sedimentation device in a water treatment system using ultrasonic technology.

In order to solve the technical problem described above, the present invention provides a method for washing a sedimentation device in a water treatment system using ultrasonic, which comprises:

providing an ultrasonic transmitting device for transmitting ultrasonic of a power and transmitting frequency;

transmitting the ultrasonic from the ultrasonic transmitting device within water to the sedimentation device.

The present invention provides a method for washing a sedimentation device in a water treatment system using ultrasonic, which comprises the steps of:

providing an ultrasonic transmitting device for transmitting ultrasonic of a power and transmitting frequency;

moving the ultrasonic transmitting device within water over the sedimentation device so that the ultrasonic transmitted reaches the sedimentation device.

In one embodiment of the invention, the sedimentation device is an inclined tube in a mechanical accelerated clarification basin. In another embodiment of the invention, the sedimentation device is a corrugated plate in a horizontal flow sedimentation tank.

In one embodiment of the invention, the power and transmitting frequency of ultrasonic are set so that both washing effect and water clarification effect can be satisfied. In one embodiment of the invention, the power of ultrasonic is preferably ranged from about 0.01 to about 0.5 W/cm$^2$, more preferably from about 0.01 to about 0.1 W/cm$^2$. In one embodiment of the invention, the transmitting frequency of ultrasonic is preferably no larger than 50 KHZ, more preferably ranged from about 18 to about 48 KHZ, more preferably ranged from about 18 to about 40 KHZ.

In one embodiment of the invention, in the step of moving the ultrasonic transmitting device, the ultrasonic transmitting device is moved in such a reciprocating way that the ultrasonic transmitted substantively evenly reaches the sedimentation device. In one embodiment of the invention, the ultrasonic transmitting device is moved in such a reciprocating scanning way that the ultrasonic transmitted substantively evenly reaches the surface of the inclined tube or the corrugated plate. When the scanning reaches a scanning number or scanning time set for a current cycle, it needs to end washing for the current cycle, then to stop or start an operation of a next cycle according to a predetermined requirement. The process may also be set to operate continuously.

The present invention also provides a system for washing a sedimentation device in a water treatment system by using ultrasonic, comprising an ultrasonic transmitting device for transmitting ultrasonic in water to wash the sedimentation device.

The present invention also provides a system for washing a sedimentation device in a water treatment system by using ultrasonic, comprising:

an ultrasonic transmitting device for transmitting ultrasonic to wash the sedimentation device; and a carrying device connected to the ultrasonic transmitting device for moving the ultrasonic transmitting device in water within the water treatment system so that the ultrasonic transmitted reaches the sedimentation device.

The carrying device may be controlled by a computer.

In one embodiment of the present invention, the ultrasonic transmitting device is mounted to the carrying device, and the carrying device comprises:

an operation track installed in the water treatment system;

a moving car body mounted on the operation track;

a driving device for driving the moving car body to move on the operation track; and a car body position detection and control device for detecting the position of the car body and controlling the moving direction of the driving device according to the detected result.

In one embodiment of the present invention, the ultrasonic transmitting device is connected to the carrying device, and the carrying device is provided outside the water treatment system. For example, the ultrasonic transmitting device is suspended under the carrying device that may have a track over the water treatment system.

In one embodiment of the present invention, the water treatment system is a water treatment system with a sedimentation device, such as a mechanical accelerated clarification basin or a horizontal flow sedimentation tank, etc.

In one embodiment of the present invention, the operation track is comprised of an inner ring operation track and an outer ring operation track that are concentric and mounted in a circular water treatment system, or two moving tracks mounted on two opposite sidewalls of a rectangular water treatment system, or a track of a shape that matches the water treatment system.

In one embodiment of the present invention, the moving car body is mounted to the operation track by roller wheels; the driving device is a motor for driving the moving car body to move along the operation track and/or driving the ultrasonic transmitting device to move along the moving car body; the car body position detection and control device includes a position sensor element and a motor controller, wherein the position sensor element(s) is(are) provided on at least one of the operation tracks and/or the moving car body. When the car body and/or the ultrasonic transmitting device is detected to reach the position, a signal is sent to the corresponding motor controller to control the car body to change the moving direction, thereby the car body performing reciprocating scanning movement on the operation track and/or the moving car body.

In one embodiment of the present invention, the ultrasonic transmitting device is a sealed box in which at least one ultrasonic transverter is set. When more than two ultrasonic transverters are used, they may be arranged in linear or other suitable arrangements.

In the invention, the vibration caused by breaking of ultrasonic cavitation bubbles in water is utilized to wash the inclined tube(s) or corrugated plate(s) in a water treatment system without stopping the operation, its function is obvious. The effects are greatly better than that of manually washing with high pressure water, and there are no dead corners. The invention provides the necessary conditions for a long term stable operation of a mechanical accelerated clarification basin, and effectively decreases the number of times for backwashing the subsequent filter pool. By using the method of the invention, the consumption of water, treatment reagents and manpower can be decreased and the service life of the inclined tube can be prolonged so that the cost of water production is effectively decreased. With this technology, the miscellaneous process of manual washing with high pressure water, which is time-consuming, hard working and water wasting, may be declared to be a history.

The invention has solved a difficult problem which perplexes water supply enterprises for a long time, and it certainly will bring significant economic and social benefits. This is particularly important and has wide popularization value when the water resources are increasingly deficient in the country and even in the world today.

DETAILED DESCRIPTION OF THE INVENTION

Figure 1:
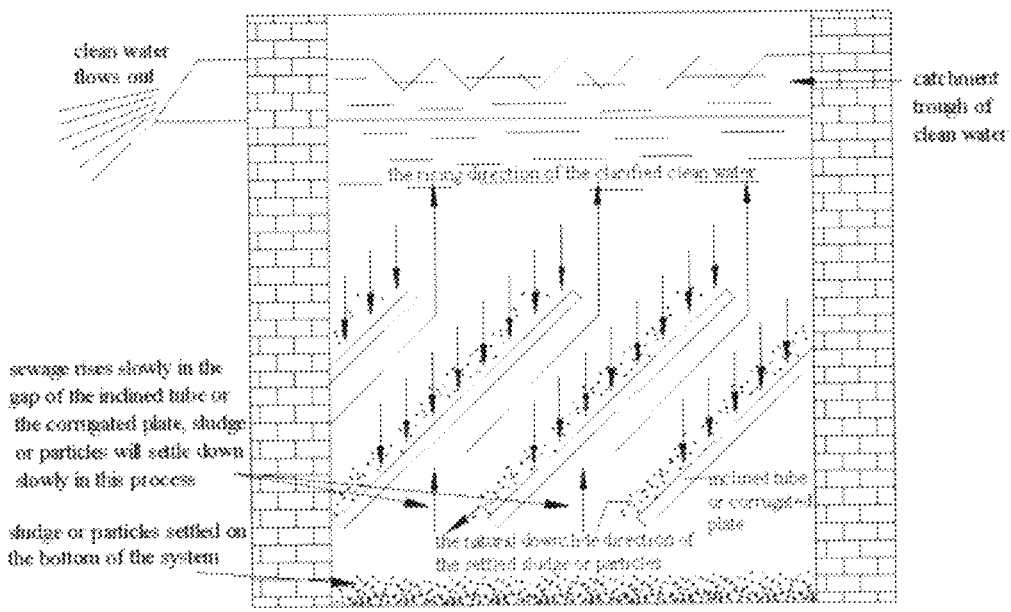
FIG. 1 is a diagram of clarification principle of an inclined tube in a mechanical accelerated clarification basin and a corrugated plate in a horizontal flow sedimentation tank.
Figure 2:
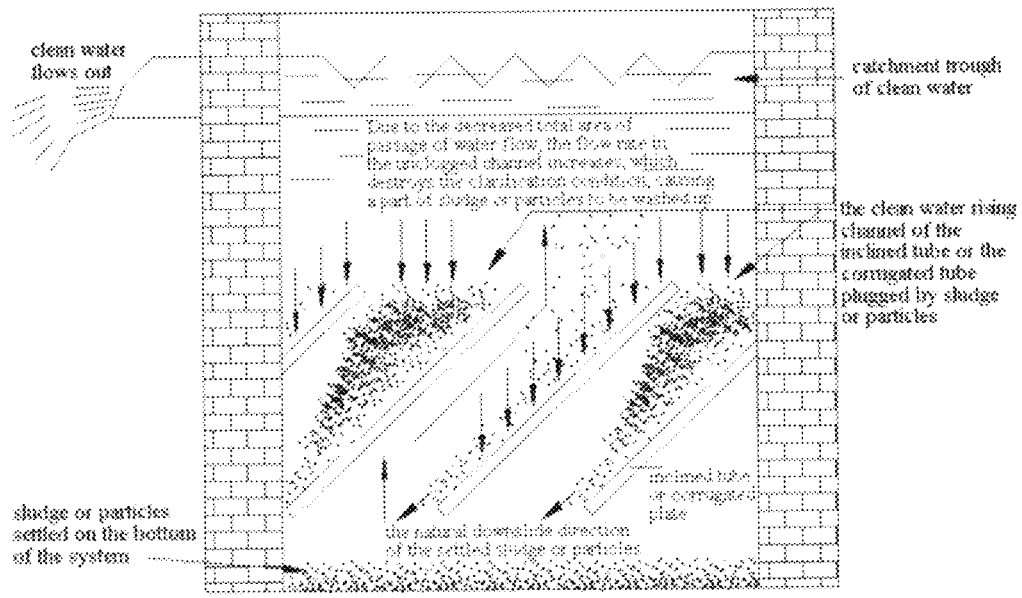
FIG. 2 is a schematic diagram of the clogging process of the inclined tube in the mechanical accelerated clarification basin and the corrugated plate in the horizontal flow sedimentation tank.
Figure 3:
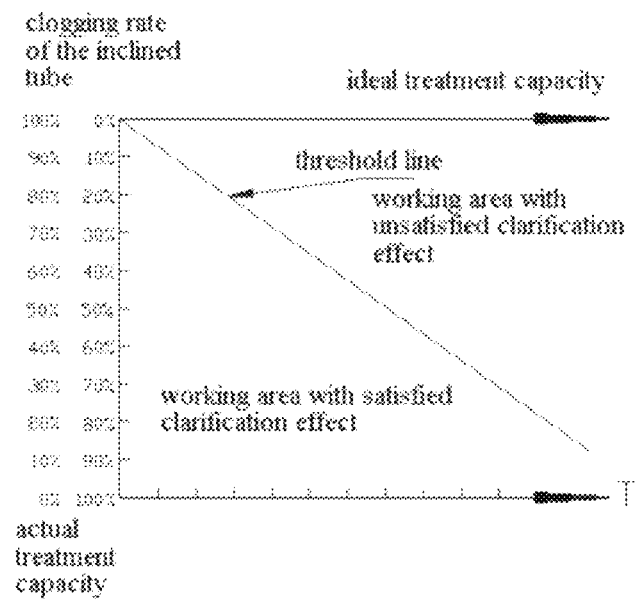
FIG. 3 is a graph of relationship between the water treatment capacity of the mechanical accelerated clarification basin and the degree of clogging in the inclined tube.

The basic idea of the invention is to wash the sedimentation device in a water treatment system by using vibration resulting from ultrasonic cavitation in water.

First the inventor found that vibration technology is a good way to let the sludge settled on the inclined tube (or the corrugated plate) and floccules in water successfully slide down. Furthermore, this technical solution should not affect water flow direction and flow rate, and then the purpose of separating clean water from sewage can be achieved.

After many experiments, the inventor invented an ultrasonic washing system with special design that can implement the vibration washing technology.

The principle of ultrasonic washing is based on cavitation, i.e., rapidly forming countless small bubbles in a liquid and fast imploding. Thus the vibration generated from implosion removes filth away from the internal and external surface of an object immersed in a liquid. An ultrasonic transmitting device includes a transverter for transforming the electric energy to mechanical energy and an ultrasonic generator for generating high frequency electrical signals. Like other acoustic waves, ultrasonic is a series of pressure points, i.e., a wave with alternate compression and expansion. If the acoustic energy is strong enough, the liquid is pushed away in wave expansion stage, thus bubbles are formed. While in wave compression stage these bubbles are exploded or imploded instantly to generate a very effective impulsive force, vibration, which is especially suitable for washing. This process is called cavitation.

Because ultrasonic can penetrate fine gaps and pores, it can be applied to wash an object in any shape. Ultrasonic washing is much faster for removing scale from a work piece than a conventional washing means. Assembly parts can be washed without disassembly too. The advantage that ultrasonic washing can save labor makes it the most economical way to wash. In addition, because ultrasonic is ubiquitous in the liquid, no dead corners will occur in the washing process.

In water treatment industry, especially in non-stop treatment for the sedimentation device, there has been no actual application of or related research on ultrasonic technology. Because a traditional washing process design is basically to wash filth which has already formed on a surface of an object (such as oxide layer, grease stain, etc.), it is generally provided with a cleaning trough. The object is put into the cleaning trough, an effective detergent is added, and then the cleaning purpose is achieved by physical action of vibration caused by ultrasonic with chemical dissolution effect of the detergent. For a single object, the current cleaning process is completed when the cleaning requirement is met. In a traditional cleaning process no matter which uses only physical action of ultrasonic or combines with chemical action of the detergent, the cleaning area is relatively small, so the process is easily realized. However in the water treatment industry, especially in non-stop treatment for the sedimentation device, it is not limited to internal surface treatment in regional pipelines or containers. The cleaning area required to be cleaned is very large. And it is required to continuously clean the filth formed continuously on the same object and prevent it from forming again.

In addition, in the traditional cleaning process, there are no excessive requirements for the acoustic intensity of ultrasonic and the hydrodynamic characteristics of liquid in the sedimentation device. Because in washing application, the acoustic intensity of ultrasonic can not reach the intensity at which the structural characteristics of the object itself is damaged, usually the higher the acoustic intensity of ultrasonic, i.e., the higher the power per unit, the better the washing effect and the shorter the washing time.

In non-stop treatment for the sedimentation device, because of its unique sedimentation feature, if the acoustic intensity is too high, i.e., the power per unit is too high, the hydrodynamic characteristics of liquid and the sedimentation characteristics of the sedimentation device will be damaged. Furthermore, since the treatment area required for the sedimentation device in water treatment industry is large and the feature of water treatment requires avoiding the usage of chemical means, the process design required is comparatively complicated. It needs repetitive investigations and tests to determine suitable power per unit area and reasonable device structure design, so as to achieve the treatment with wide range, pure physical action, non-stop treatment, continuous and effective treatment effect on the sedimentation device in water treatment industry by using ultrasonic technology.

The invention will be further described with the system and method for washing the inclined tube in the mechanical accelerated clarification basin as an example.

In the mechanical accelerated clarification basin, a washing system for washing the inclined tube or the corrugated plate using vibration resulting from ultrasonic cavitation is installed. The system includes a carrying device and an ultrasonic transmitting device.

Figure 4:
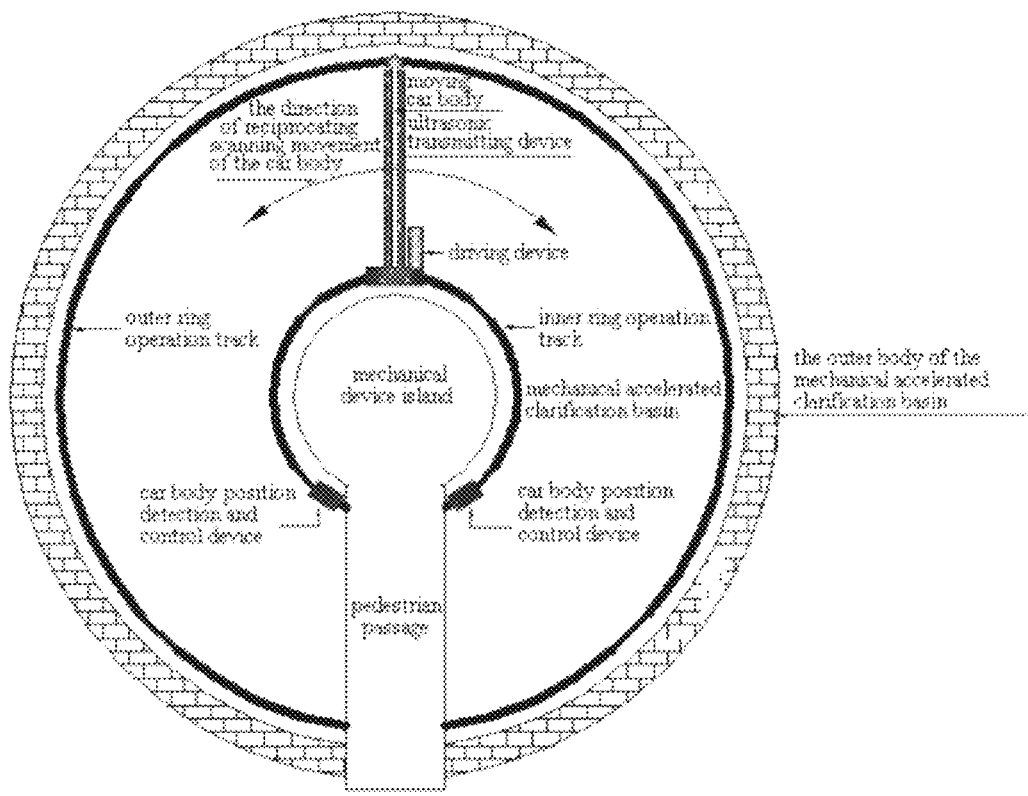
FIG. 4 is a top view of a washing system according to an embodiment of the invention.
Figure 5A:
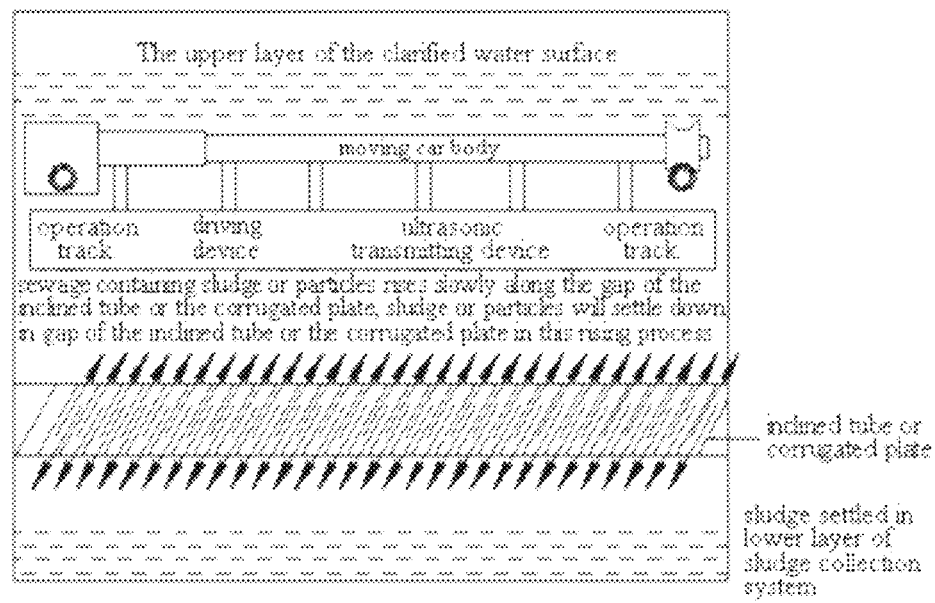
FIGS. 5A and 5B are schematic diagrams of cross section of the washing system in water according to an embodiment of the invention.
Figure 5B:
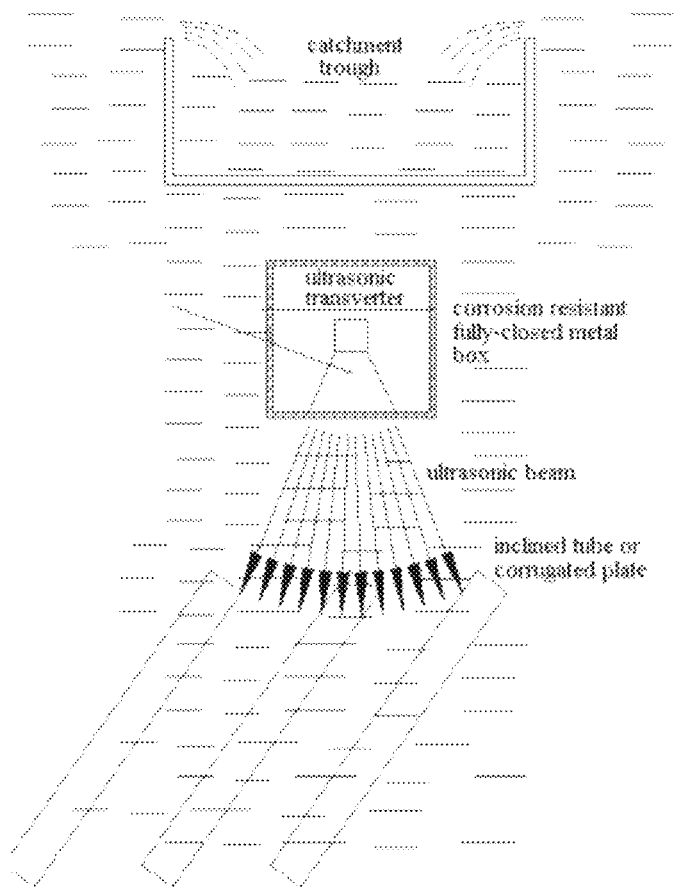

As shown in FIGS. 4, 5A and 5B, the carrying device is provided in a water treatment system for supporting the ultrasonic transmitting device and at the same time driving the whole equipment to perform moving, for example, reciprocating scanning movement, over the inclined tube to be cleaned (under water). The carrying device includes an operation track, a moving car body, a driving device, and a car body position detection and control device. The carrying device may be also provided outside of the water treatment system.

In one embodiment, the operation track is comprised of an inner ring operation track and an outer ring operation track that are concentric. There may be a mechanical device island within the inner ring operation track, and one segment on both the inner and the outer ring operation tracks may be vacated as pedestrian passage. The moving car body may be mounted on the inner and the outer operation tracks by roller wheels. The driving device may be a motor for driving the moving car body to move along the operation track. The car body position detection and control device may include a position sensor element and a motor controller. The position sensor element may be installed on the inner (or outer) operation track. When the car body is detected to reach the position, a signal is sent to the motor controller to control the car body to change the moving direction, so that the car body can perform reciprocating circumferential scanning movement on the operation track.

The ultrasonic transmitting device installed on the carrying device may be a sealed box in rectangle or other shape. At least one ultrasonic transverter is set in the box. When more than two ultrasonic transverters are used, they may be arranged in linear or other suitable ways in the sealed box. When the ultrasonic transmitting device operates, ultrasonic transmitted can cover the inclined tube or the corrugated plate within certain radius under water.

The concrete structure of the carrying device of the invention is associated with the shape of the water treatment system and the installation position of the sedimentation device. In the event of a rectangular water treatment system, the operation track system can be comprised of two operation tracks positioned on two sidewalls of the water treatment system. When both the length and the width of the water treatment system are large, two sets of driving devices may be needed, one is used for driving the car body to move reciprocatingly forward-backward on the operation track, the other is used for driving the ultrasonic transmitting device to move reciprocatingly left-right along the car body. Accordingly, a set of car body position detection and control device may be installed on each of the operation tracks and the car body respectively. In this situation, the ultrasonic transmitting device can also cover the area where the inclined tube is required to wash by means of the lateral movement and the longitudinal movement of the car body.

If the area of the inclined tube or the inclined plate required to wash is relatively small, the system of the invention may have no carrying device but only an ultrasonic transmitting device. In such a case at least one or more than one fixed ultrasonic transverters may be provided.

The carrying device may have many implementation modes that may be known by those skilled in the art, even for the water treatment system with the same shape. The invention is not limited to a specific form of a carrying device, as long as it enables the ultrasonic transmitting device to move to the area required to be washed in the sedimentation device.

Referring to FIG. 5A and FIG. 5B, the ultrasonic transmitting device is mounted under the car body at a level where it should be immersed in water when it works. When working, the ultrasonic transmitting device performs reciprocating scanning movement above the inclined tube so that ultrasonic is substantively evenly transmitted to the surface of the inclined tube or the corrugated plate through water, and thereby the adhesive force of sludge and flocculle settled on the surface of the inclined tube or the corrugated plate decreases sharply under ultrasonic cavitation and vibration.

Figure 6:
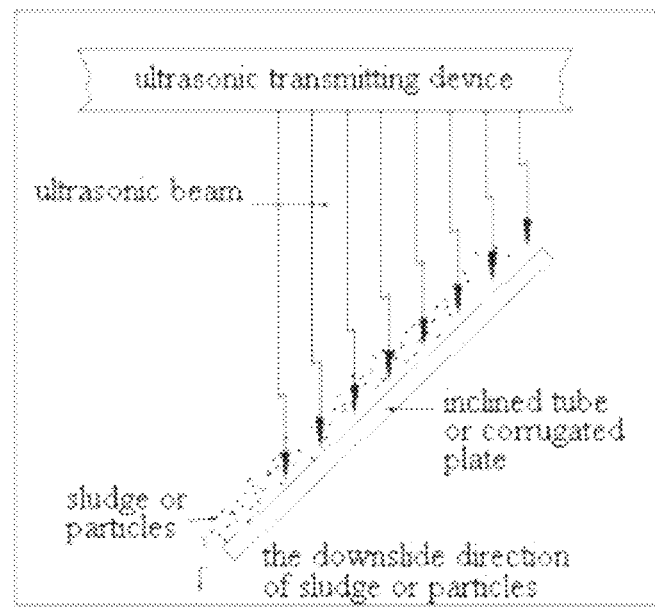
FIG. 6 is a diagram of principle of washing the inclined tube and the corrugated plate using vibration caused from breaking ultrasonic cavitation bubbles.

As shown in FIG. 6, after being transmitted, ultrasonic propagates to the surface of the inclined tube through water, generating cavitation bubbles. The vibration resulting from the instant breaking of the bubbles forces the sludge or particles attached on the surface of the inclined tube to remove from the surface. The sludge and floccules slide down naturally by their own weights along the inclined tube or the corrugated plate, which prevents the clogging phenomenon on the inclined tube or the corrugated plate caused by the accumulated sludge and floccules. Because the clogging phenomenon generally no longer occurs in the inclined tube or the corrugated plate, it fundamentally ends manual washing and clearing operation performed upon periodic stop production with water discharge, and achieves a really good solution without stopping water supply to remove sludge in a water treatment process.

The above washing system is also suitable to wash the corrugated plate in a horizontal flow sedimentation tank. Although the horizontal flow sedimentation tank has a configuration different from that of the mechanical accelerated clarification basin, their operation principles are the same.

The present invention further provides a method for washing a sedimentation device in a water treatment system using ultrasonic, the method comprising:

providing an ultrasonic transmitting device in water for transmitting ultrasonic of a power and transmitting frequency; and transmitting ultrasonic of the power and transmitting frequency to the sedimentation device.

The present invention further provides a method for washing a sedimentation device in a water treatment system using ultrasonic, comprising the steps of:

providing an ultrasonic transmitting device for transmitting ultrasonic of a power and transmitting frequency;

moving the ultrasonic transmitting device in water over the sedimentation device so that ultrasonic transmitted reaches the sedimentation device.

The present invention further provides a method for washing a sedimentation device in a water treatment system using ultrasonic, the method comprising the steps of:

providing an ultrasonic transmitting device for transmitting ultrasonic of a power and transmitting frequency;

moving the ultrasonic transmitting device by a carrying device over the sedimentation device so that ultrasonic transmitted substantively evenly reaches the sedimentation device.

When the power is too high, vibration resulting from strong cavitation mixes water with filth, such as the settled sludge or algae attached on the inclined tube, so that water will become turbid and the mechanical accelerated clarification basin is of no effect; when the power is too low, the algae attached on the inclined tube and the accumulated sludge cannot be removed. According to the clogging situation in each water treatment system in different operation stage, the power and transmitting frequency of ultrasonic can be adjusted so that both washing effect and water clarification effect can be satisfied. In one embodiment of the invention, the power of ultrasonic is preferably in a range from about 0.01 to about 0.5 $W/cm^2$, preferably from about 0.01 to about 0.1 $W/cm^2$. In one embodiment of the invention, the ultrasonic frequency is preferably no larger than 50 KHZ, more preferably ranged from about 18 to about 48 KHZ, more preferably ranged from about 18 to about 40 KHZ.

In one embodiment of the method of the present invention, the sedimentation device may be an inclined tube or a corrugated plate.

In the step of moving the ultrasonic transmitting device by a carrying device, the carrying device may move the ultrasonic transmitting device to scan reciprocatingly over the sedimentation device, laterally and/or longitudinally, or circularly, or in other suitable ways, so that ultrasonic transmitted substantively evenly reaches the sedimentation device.

In one embodiment of the present invention, the method further comprises:

ending one cycle of washing when the ultrasonic transmitting device moves reciprocatingly one round or several rounds, and then stopping or starting another cycle of washing according to a predetermined requirement.

The washing process above can be performed automatically and periodically, and the operation time can be determined according to water quality condition above the inclined tube or the corrugated plate in the water treatment system. A program can be made for controlling the washing process by a computer.

In another embodiment, for a water treatment system with small area, if the operation area of the ultrasonic transmitting device can be designed to cover the region where the inclined tube or the corrugated plate to be washed locates, the carrying device may be not needed.

In the experiment carried out by the inventor, after the device of the present invention is initiated and the operation frequency and power are set, a large number of bubbles are drawn from an inclined tube under an ultrasonic buoy. Adhered matters (including algae and the settled sludge) on the inclined tube are removed gradually by ultrasonic cavitation and settled gradually along the wall of the inclined tube, while the inclined tube itself also restores progressively its original color from up to down. This shows that ultrasonic cavitation is marvelous. After a few minutes, most of the adhered matters on the inclined tube are removed. With the time going, the adhered matters on the inclined tube are removed basically. According to a rough estimation, the washing effect should be more than 95%.

Figure 7:
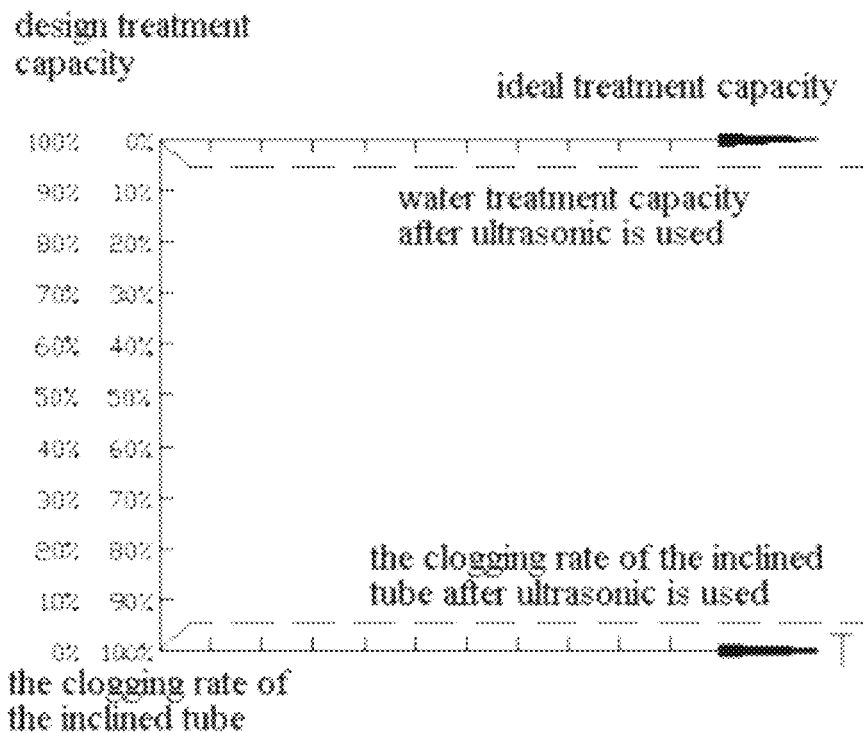
FIG. 7 is a schematic diagram of clogging rate, actual treatment capacity and ideal treatment capacity of the inclined tube after ultrasonic is used.

After used for a period of time, the sedimentation inclined tube is as bright and clean as new without any algae growth and sludge clogging, the water output is uniform and stable, and the effluent water quality apparently higher than that of a treatment system which does not use the treatment device. Experiments show that periodically repeated treatment of the inclined tube using ultrasonic technology in the case of non-stop production destroys the growth and reproduction of the algae on the inclined tube, improves evenly the flowability of sludge in the inclined tube, and avoids the gap clogging of the inclined tube (or the corrugated plate). Therefore, stop-production for washing in a water treatment process is entirely avoided. Its effect can be seen from FIG. 7, the relationship of the clogging rate, actual treatment capacity and ideal treatment capacity of the inclined tube after ultrasonic is used according to the present invention.

In conclusion, the invention has the following prominent technical effects:

1) A great amount of water used for wash and water with the treatment reagent is saved.

2) The manpower resources and labor intensity required for washing the system are reduced.

3) The consumption of the treatment reagent is decreased.

4) The service life of the inclined tube, the corrugated plate, and the supporting truss are prolonged.

5) The effluent water quality of the mechanical accelerated clarification basin or the horizontal flow sedimentation tank is improved, the backwashing cycle of the subsequent sand filter tank is effectively extended, the operation time of a reflux pump is reduced, and power consumption is saved.

6) The service life of quartz sand in the subsequent filter tank is effectively prolonged, and the cost of water production is decreased.

Taking an accelerated sedimentation basin which is common in the country as example here, since multiplication of algae and adding of the treatment reagent in water are different in each season, a cycle of manual water surface washing is from one week to two months according to season and water quality. Each water surface washing averagely needs two to three working days, the semi-finished water needing to be drained from the system in each water surface washing is about 2000 tons, the treatment reagent drained with water is about 50 kg, and liquefied chlorine is about 120 kg. In addition, manual water surface washing also needs 30 tons of the finished water.

The direct cost, such as the related manpower, loss of water and the treatment reagent in each water washing is about 5,000 yuan (RMB). At the same time, the normal production of water also has to be stopped in water washing. The yield of water production affected in each water washing is about 20,000 tons. Taking Beijing region as example, the retail price of the treated water is 3.7 yuan (RMB)/m$^3$, so the normal return reduced due to stop production for water washing is about 74,000 yuan (RMB).

In a word, the expenses such as manpower directly investing in water washing for each mechanical accelerated clarification basin per year is about 60,000 yuan (RMB); assuming the water washing is carried out once a month averagely, so the lost water is about 2,000 tons. The affected normal water yield is about 240,000 tons. The loss of total expenses and the affected normal water yield is about 900,000 yuan (RMB).

Typical data collected by certain water plants involved in the experiment shows that the consumed water for the production of one ton finished water is 100-150 kg according to current technological process, quite a part of which is consumed in water washing process.

In the case that domestic water resources supply becomes more serious, if this advanced ultrasonic technology and the process of treating the sedimentation device in water treatment are widely adopted, the immensurable water saving effect will be generated macroscopically, while tremendous economic benefits will be brought for water supply enterprises.

From the principle of the invention, it is apparent that the system and method of the invention is not limited to the washing of the inclined tube in a mechanical accelerated clarification basin and the corrugated plate in a horizontal flow sedimentation tank, it is also applicable to sedimentation devices in other water treatment systems in water treatment project.

While the present invention has been described in detail above, the disclosed embodiments are not to be interpreted as limiting. Those skilled in the art will appreciate that numerous variations and modifications of the above described systems and methods can be made without departing the spirit and scope of the invention as set forth in the appended claims.

What is claimed is:

1. A system for washing a sedimentation device in a water treatment system using ultrasonic waves, comprising:
   an ultrasonic transmitting device for transmitting ultrasonic waves in water to wash the sedimentation device;
   a carrying device connected to the ultrasonic transmitting device for moving the ultrasonic transmitting device in water within the water treatment system so that the ultrasonic waves transmitted reaches the sedimentation device;
   the carrying device comprises:
   an operation track installed in the water treatment system;
   a moving car body mounted on the operation track;
   a driving device for driving the moving car body to move on the operation track; and
   a car body position detection and control device for detecting the position of the car body and controlling the moving direction of the driving device according to the detected result.

2. The system according to claim 1, wherein the water treatment system is a mechanical accelerated clarification basin or a horizontal flow sedimentation tank.

3. The system according to claim 1, wherein the operation track has a shape that fits the water treatment system;
   for a circular water treatment system the operation track includes an inner ring operation track and an outer ring operation track, which are substantively concentric;
   for a rectangular water treatment system the operation track includes two moving tracks mounted on two opposite sidewalls of the rectangular water treatment system.

4. The system according to claim 1, wherein the moving car body is mounted on the operation track by roller wheels; the driving device is a motor for driving the moving car body to move along the operation track and/or driving the ultrasonic transmitting device to move along the moving car body; the car body position detection and control device includes a position sensor element and a motor controller; the position sensor element is installed across at least one of the operation tracks and/or the moving car body; when the car body and/or the ultrasonic transmitting device is detected to operate in the position, signals are sent to a corresponding motor controller to control the car body to change its moving direction, so that the car body performs reciprocating scanning movement on the operation track and/or the moving car body.

5. The system according to claim 1, wherein the ultrasonic transmitting device is a sealed box in which at least one ultrasonic transverter is arranged; when more than two ultrasonic transverters are used they are arranged in linear or other suitable ways.

6. The system according to claim 1, wherein the sedimentation device is an inclined tube in a mechanical accelerated clarification basin or a corrugated plate in a horizontal flow sedimentation tank.

7. The system according to claim 1, wherein the power of the ultrasonic waves transmitted by the ultrasonic transmitting device is ranged from about 0.1 to about 0.5 W/cm$^2$.

8. The system according to claim 1, wherein the transmitting frequency of the ultrasonic waves transmitted by the ultrasonic transmitting device is no larger than 50 KHZ.

9. The system according to claim 1, wherein the transmitting frequency of the ultrasonic waves transmitted by the ultrasonic transmitting device is ranged from about 18 to about 48 KHZ.

10. The system according to claim 1, wherein the transmitting frequency of the ultrasonic waves transmitted by the ultrasonic transmitting device is ranged from about 18 to about 40 KHZ.

* * * * *

UNITED STATES PATENT AND TRADEMARK OFFICE
CERTIFICATE OF CORRECTION

| | | |
|---|---|---|
| PATENT NO. | : 8,132,581 B2 | Page 1 of 1 |
| APPLICATION NO. | : 12/132547 | |
| DATED | : March 13, 2012 | |
| INVENTOR(S) | : Shun Guo | |

It is certified that error appears in the above-identified patent and that said Letters Patent is hereby corrected as shown below:

On the Title Page of the patent the following should be added under Foreign Application Priority Data:

(30) CHINA    200610138173.5    11-14-2006

Signed and Sealed this
Seventeenth Day of April, 2012

David J. Kappos
*Director of the United States Patent and Trademark Office*